United States Patent [19]
Patten et al.

[11] 3,804,532
[45] Apr. 16, 1974

[54] TRANSPARENT FILM UNIFORMITY GAUGE

[75] Inventors: Raymond A. Patten, Oxon Hill; Paul P. Bey, Temple Hills, both of Md.

[73] Assignee: The United States of America as represented by the Secretary of the Navy, Washington, D.C.

[22] Filed: Aug. 3, 1972

[21] Appl. No.: 277,536

[52] U.S. Cl. .............................. 356/108, 356/161
[51] Int. Cl. ............................................. G01b 9/02
[58] Field of Search .......... 356/108, 161, 168, 202; 250/559

[56] References Cited
UNITED STATES PATENTS
3,708,229   1/1973   Pircher ................................ 356/108
3,620,814   11/1971  Clark et al. ........................ 356/108
3,059,611   10/1962  Fury et al. ............................ 118/8

Primary Examiner—Ronald L. Wibert
Assistant Examiner—Paul K. Godwin
Attorney, Agent, or Firm—R. S. Sciascia; Arthur L. Branning; Philip Schneider

[57] ABSTRACT

Apparatus for checking the uniformity of thickness of a thin film during the deposition process comprising means for separating a narrowband light beam into two separate beams and alternately blocking one or the other; means for projecting the beams through the thin film at two different locations interference effects occuring in each beam; means for detecting the light coming through the film; means for measuring the average value of the two beams, subtracting the difference and averaging the difference; and means for recording the difference.

5 Claims, 4 Drawing Figures

TRANSPARENT FILM UNIFORMITY GAUGE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to optical film-thickness monitors and especially to apparatus which can continually monitor the difference in thickness at two locations of a film while the film is being deposited on a substrate.

The field of electronics employs metallic thin films deposited on substrates in various applications. It is usually important both that the film be deposited evenly and that the thickness of the deposited film be ascertainable at all times during the deposition process so that the process does not have to be stopped and the chamber opened until the desired film thickness is obtained. Measurement of film thickness may be accomplished by electronic means which usually entails placing electronic equipment inside the vacuum deposition chamber. Since the heat inside the vacuum chamber may reach 400° C. or more during the preliminary outgasing process, the electronic equipment is subject to failure and inaccurate performance.

BRIEF SUMMARY OF INVENTION

The objects and advantages of the invention are accomplished by sending two, in-phase beams of light through a thin film where interference effects occur when the film is an integral multiple of a quarter-wave length, the interference effects giving maxima and minima light transmissions. The light from each beam is detected and the differences between the average values of the detected light from each beam is averaged and recorded.

An object of the invention is to continuously measure nonuniformity in the thickness of a transparent film during the deposition process.

Another object is to provide apparatus for measuring nonuniformity in the thickness of a transparent film, said apparatus having no components in the vacuum deposition chamber subject to heat deterioration.

Other objects, advantages and novel features of the invention will become apparent from the following detailed description of the invention when considered in conjunction with the accompanying drawings wherein:

DETAILED DESCRIPTION OF THE INVENTION

Figure 1:
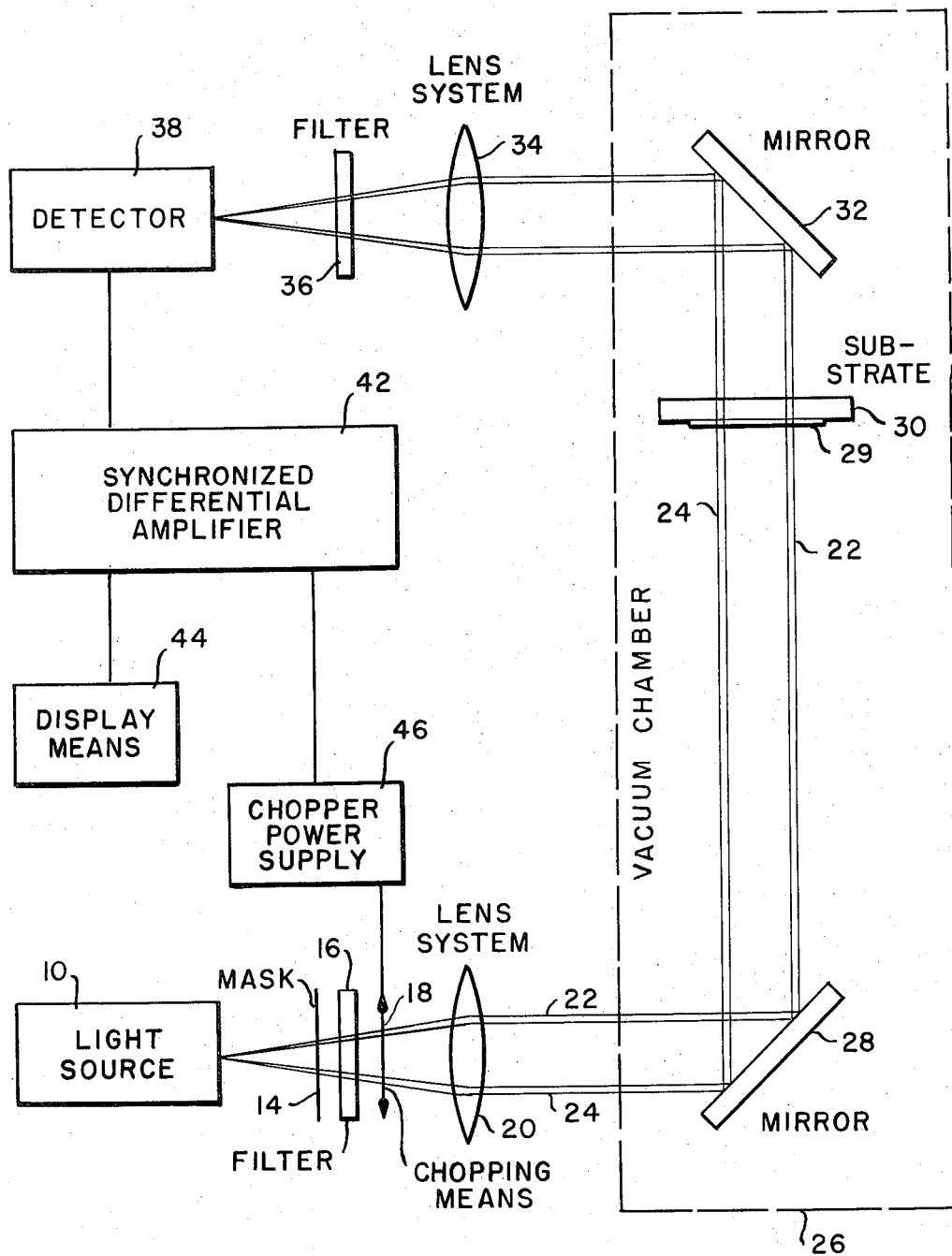
FIG. 1 is a schematic illustration, partially in block form, of an embodiment of the invention.
Figure 2:
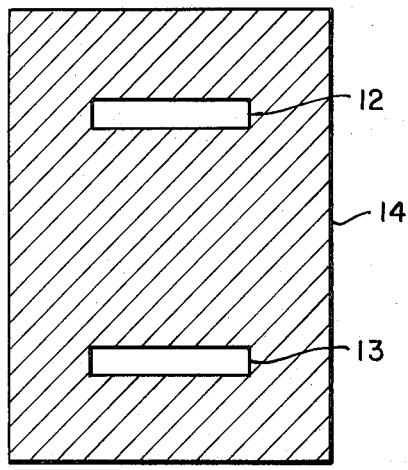
FIG. 2 is a representation of a mask that can be used with the invention.

FIG. 1 is a schematic illustration, partially in block form, of an embodiment of the invention. A light source 10 projects a beam through a mask 14 (see FIG. 2) having a pair of slits 12 and 13 therethrough, thus separating the original beam into a pair of in-phase beams. These are passed through a narrowband light filter 16. If a CW laser source of light is used, no narrowband filter is required since the bandwidth of laser sources is narrow enough.

The light beams 22 and 24 are alternately blocked by a chopper 18 and then passed through a lens system 20 for collimation. The beams 22 and 24 are then projected through the film 29 which is being deposited on a transparent substrate 30. The substrate and film are in a vacuum chamber 26 and a light-bending system indicated by mirrors 28 and 32 may be necessary. However, it is also possible to pass the light straight through without bending. The beams then pass through another lens system 34 which focuses them on a detecting means 38 after passing through another narrowbanding filter 36. The latter removes any background light (or noise) picked up by the beams in passing through the apparatus.

The detecting means may, for example, be a silicon photodiode, providing a d.c. voltage output proportional to the amplitude of the light which falls on it. The output of the detector 38 is fed to a synchronized differential amplifier (also known as a lock-in amplifier) which is synchronized to the light-chopping means 18 through the chopper power supply 46. This means that the amplifier 42 is synchronized with the two light beams 22 and 24. The output of the amplifier 42 is fed to a display means 44 such as a strip recorder, preferably.

In operation, part of either light beam (e.g., 22) passes through the film 29 and substrate 30, but part is reflected back from the film surface and part from the substrate surface (where the film adheres to the substrate). The part which is reflected back from the substrate surface is again partially reflected back from the film surface so that it is going in the forward direction again, and this part will combine with the part of beam 22 which passes directly through the film and substrate. The combination of these beams results in an interference process which, when the film thickness is a quarter-wavelength (of the light) or any integral multiple of a quarter-wavelength, gives a maximum or minimum transmission of light. (If the refractive index of the substrate is greater than that of the film, the first quarter-wave-length thickness of the film gives a maximum transmission. If the substrate index is less than the film index, a minimum transmission is obtained.)

Thus, each beam generates its own interference pattern which grows to maximum intensity and then minimum intensity (or vice versa) as the thickness of the film increases. The output from the detector 38 corresponds to the instantaneous light intensity. The differential amplifier 42 (which may, for example, be a Princeton Applied Research HR-8 amplifier) subtracts the intensities of the two beams during each cycle, amplifies the difference and averages the resultant differences over a specified period of time. If the film deposits at the same rate on the two different spots on the film (corresponding to the two light beams), then the extreme (maxima and minima) occur at the same times, the difference is zero and the output of the amplifier 42 is zero. If the deposition is nonuniform, the extrema occur at different times and the amplitude of the difference signal and the d.c. output of the amplifier 42 as recorded on the strip recorder is a measure of the nonuniformity. It is apparent that the differences in intensity due to the interference fringe patterns will be much greater than the differences in intensity due to the slightly greater absorption of light going through a thin film at a spot a few angstrom units thicker than another spot.

The light source and filter 16 should preferably be in the visible range for ease of alignment and detection, as well as for good sensitivity to thickness differences. Since coherent summation occurs over a range $\lambda^2/\Delta\lambda$, where $\lambda$ is the wavelength of the light passed by the filter and $\Delta\lambda$ is its bandwidth, the parameters of the filter must be chosen to give an adequate range of sensitivity. For a wavelength of 5,000 Angstroms and a bandwidth of 200 Angstroms, the coherence length is 125,000 Angstroms.

Figure 3:
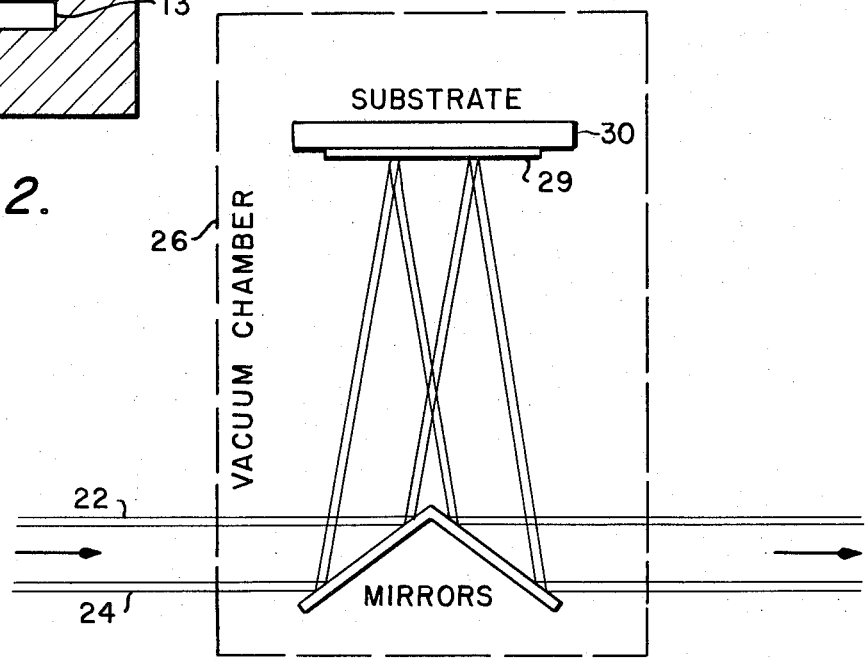
FIG. 3 is a schematic illustration of a manner in which the invention can be adapted for operation in the reflective mode.

It should be noted that a reflection mode of operation is also possible if the substrate 30 is not transparent. Thus, in FIG. 3, the light beams 22 and 24 are projected through the film 29 and are reflected back from the substrate surface.

Figure 4:
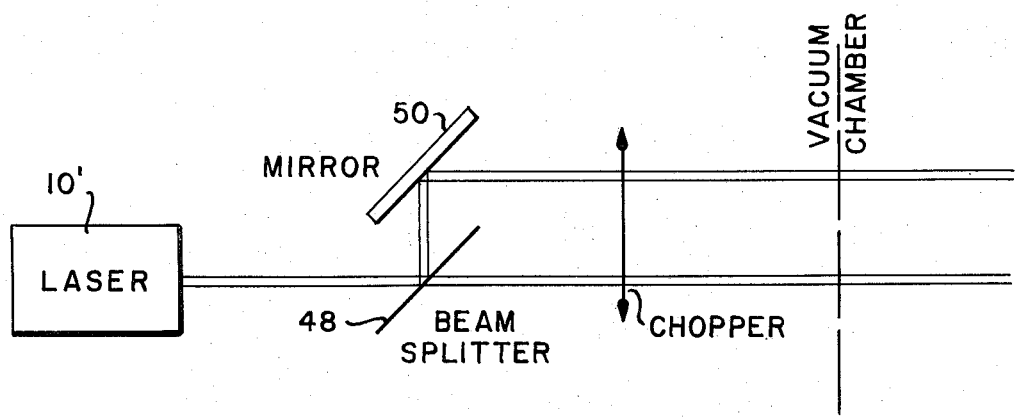
FIG. 4 shows adaptation of the invention for operation with a laser light source.

FIG. 4 shows how the apparatus might be modified if a laser 10 were used as the light source. The laser beam would be projected upon a beam splitter 48, part of it passing through and part being reflected upward to the mirror 50 which is oriented to reflect the upper beam parallel to and in the same direction as the lower beam.

The system may also be used to determine the overall uniformity of thin films after deposition. If one of the beams can be scanned across the film, then the variation of thickness along this line relative to the stationary beam can be determined. The coherence length of the light beams should be much less than the thickness of the substrate in order that interference effects due to thickness non-uniformities of the substrate shall not occur.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A device for monitoring the difference in thickness at two locations of a thin film which is in the process of being deposited on a transparent substrate comprising, in combination:

a narrowband light source;

means for dividing the beam from said light source into two parallel beams;

means for alternately blocking the transmission of each said light beam, whereby the transmission comprises cycles wherein each cycle contains two time-contiguous light pluses, one from each beam;

means for projecting said parallel beams through said film and substrate at two spaced locations, each beam emerging from said substrate containing its individual interference pattern as a result of internal reflections at its particular location within said film;

means for detecting said light beams and providing output signals in accordance with the differences in their intensities in each cycle, the differential output being zero when there is no difference in thickness of the film at said two locations and being greater than zero when a difference in thickness exists; and means for displaying said differential output.

2. A device as in claim 1, said narrowband light source comprising a CW light source and a narrowband filter.

3. A device as in claim 1, said narrowband light source comprising a CW laser.

4. A device as in claim 1, wherein said blocking means and said means for providing an output proportional to the differences between the output signals of said detecting means are synchronized.

5. A device as in claim 1, wherein said substrate is not transparent but is light-reflective, and further including second light-projecting for receiving the light reflected from said film and substrate and directing it to said detecting means.

* * * * *